INVENTOR:
Joseph F. Hull

By Clay Holland, Jr.
Attorney

INVENTOR:
Joseph F. Hull

By Clay Holland, Jr.
Attorney

BROADBAND CROSSED-FIELD AMPLIFIER WITH SLOW WAVE STRUCTURE INTERACTION MEANS FOR PHASE-FOCUSING THE ELECTROMAGNETIC ENERGY WITH THE ELECTRON STREAM

Filed Dec. 14, 1959

INVENTOR.
Joseph F. Hull

By Clay Holland, Jr.
Attorney 3,123,735

BROADBAND CROSSED-FIELD AMPLIFIER WITH SLOW WAVE STRUCTURE INTERACTION MEANS FOR PHASE-FOCUSING THE ELECTROMAGNETIC ENERGY WITH THE ELECTRON STREAM

Joseph F. Hull, Redwood City, Calif., assignor, by mesne assignments, to Litton Precision Products, Inc., a corporation of Delaware Filed Dec. 14, 1959, Ser. No. 859,221
21 Claims. (Cl. 315—3.6)

This invention relates to a broadband crossed-field amplifier and more particularly to a broadband forward traveling-wave amplifier for high-power operation having crossed electrostatic and magnetic fields in which the phase velocity of the space harmonic is held substantially equal to the velocity of an associated electron stream over a relative broad frequency range by means of non-dispersive, slow-wave structures.

In the prior art, it is well known that forward traveling-wave devices provided with crossed magnetic and electrostatic-fields and an electron beam are capable of simultaneously providing any two of the following features: first, high power; second, high amplification; or third, wide frequency range. However, no known prior art devices have been capable of providing all three of these features simultaneously and to the degree desired in a single device, or stated differently, no prior art device has heretofore been known to be capable of providing simultaneously, for example, 10 kilowatts of average C.W. power or one megawatt pulse output, on the order of 30 db gain, and more than 20 percent bandwidth within the various standard microwave frequency bands, such as L-band, S-band, C-band, or X-band.

The inability of such prior art devices to provide all three of these outstanding features simultaneously in a single device arises from the fact that known traveling-wave structures are inherently incapable of providing broadband frequency capabilities and high gain without compromising good heat transfer properties. More specifically, such devices typically include a slow-wave propagating circuit in the form of a helix or interdigital structure, for example, whose phase velocity versus frequency characteristic is relatively constant for a given broad frequency range. In addition, the structures are constructed such that their line impedance and the electrostatic fields associated with the structures are high to provide high-gain capabilities. However, when the slow-wave structure is supported by metallic members or is made an integral part of a large metallic body in order to provide good heat transfer properties, both the desired impedance and phase versus frequency characteristics are altered to such an extent that the structure can no longer be considered both a high impedance and broadband structure. Thus, a propagating circuit which has been designed and constructed to have broadband and high-gain characteristics is unable to retain these properties whenever efficient heat dissipating features are incorporated.

Secondly, it is difficult with a single conventional cathode and known electron optical techniques to provide an electron beam, typically in the form of a sheet or ribbon, with a current density high enough to insure high power operation, as for example to provide 10 kilowatts average C.W. operation at X-band, or one megawatt pulse operation at .001 duty cycle also at X-band, and with correspondingly higher powers at lower frequencies. Moreover, known devices of this type have substantial length, and great difficulty is encountered in focusing the electron beam within the interaction space to provide maximum coupling between the beam and the traveling space harmonic of the propagating structure. Thus, it is apparent that the provision of a device which provides, for example, ten kilowatts average C.W. power or one megawatt pulse power, at least 20 percent bandwidth within a given frequency range, and a minimum of 30 db average gain is not likely to be forthcoming from prior art traveling-wave structures and cathodes when utilized in accordance with existing techniques.

The present invention obviates the foregoing and other disadvantages of the prior art by providing a forward traveling-wave amplifier device whose basic concept is adaptable for use in any of the standard microwave frequency bands to simultaneously provide relatively high output power of the above-referenced magnitude, and on the order of 30 db gain over a 20 percent bandwidth taken with respect to the center frequency of the operating band. In accordance with the basic concept of the present invention, there is provided a magnetron type crossed-field amplifier which utilizes two different propagating structures and two sources of electrons which contribute to the formation of the electron beam in substantially different manners. More particularly, the propagating circuit comprises a first slow-wave structure of high impedance, which may, for example, have a modified split folded waveguide form or an interdigital form to provide maximum coupling efficiency between the circuit and an associated electron beam, and a second slow-wave structure of a split folded wave guide form having a larger mass than the first structure to provide maximum heat transfer capabilities, the second slow-wave structure functioning in conjunction with an electron emitting surface adjacent thereto and upon the electron stream received from the first slow-wave structure.

In accordance with the invention, each of the slow-wave structures has substantially non-dispersive characteristics adapted to pass a prescribed frequency range between discrete upper and lower cut-off frequency limits. However, where the first slow-wave structure has a high impedance characteristic, a relatively constant phase versus frequency characteristic, and a low power dissipation characteristic, the second slow-wave structure has a high power dissipation characteristic, a constant phase versus frequency characteristic, and a relatively low impedance characteristic.

It is a further characteristic feature of the crossed-field amplifier of the invention that a conventional crossed-field electron gun may be employed for generating the initial electron beam which flows in coupled relationship with the high impedance slow-wave structure, while the second electron source near the output end comprises an electron emitting surface adjacent to the second slow-wave structure for providing an abundance of electrons having a current intensity per unit length high enough to insure the desired degree of high-power operation.

It is, therefore, an object of the invention to provide a crossed-field device adapted to operate as a broadband, high gain and high power forward traveling-wave amplifier.

Another object of the invention is to provide a crossed-field amplifier whereby high amplification and high efficiency are attained over a wide frequency range.

Still another object of the invention is to provide a crossed-field amplifier having a propagating circuit capable of high power operation without sacrificing high gain and wide-frequency bandwidth capabilities.

A further object of the invention is to provide a forward traveling-wave crossed-field amplifier, which is adapted to control the flow of current in a section of its propagating circuit in a manner similar to that of a class AB amplifier.

Still a further object of the invention is to provide a crossed-field amplifier having multiple cathode devices for producing an electron stream of high enough current intensity to insure high-power operation.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are intended for the purpose of illustration and description only and are not intended to limit the scope of the invention.

FIGURE 1*a* is a schematic cross-sectional view of one embodiment of the invention;

FIGURE 1*b* is a schematic cross-sectional view of another embodiment of the invention;

FIGURE 2*a* illustrates a fragmentary section of the inter-digital propagating circuit shown in FIGURE 1*a*;

FIGURE 2*b* illustrates a fragmentary section of the modified split folded waveguide propagating circuit shown in FIGURE 1*b*;

Figures 1A, 1B:
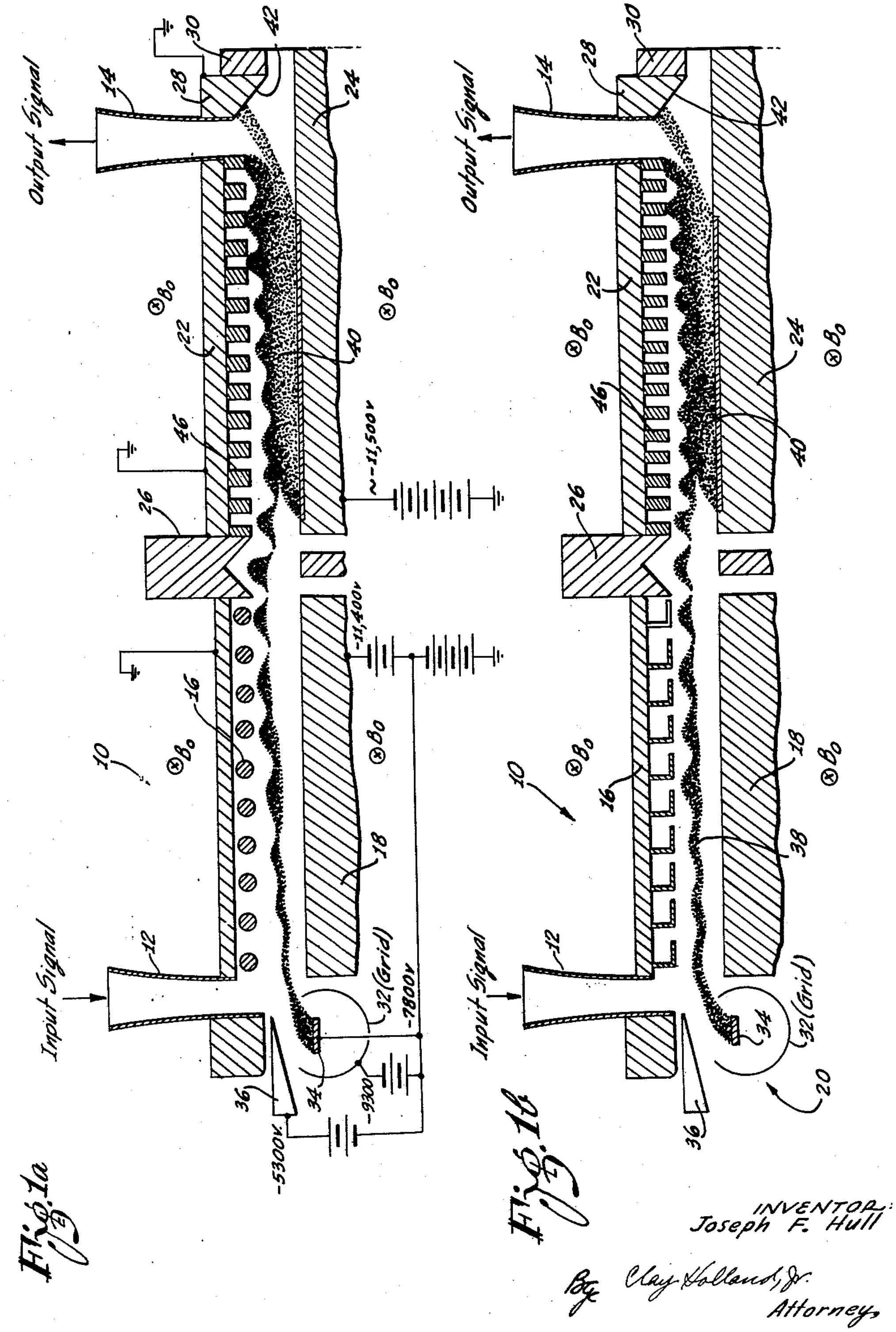

With reference now to the drawings, wherein the same reference characters are employed for design along like or corresponding parts throughout the several views, there is shown in FIGURE 1*a* a broadband crossed-field traveling-wave amplifier, generally designated 10 and constructed in accordance with the teachings of the invention, for amplifying electromagnetic wave energy applied thereto at a microwave input circuit 12 and for presenting the amplified output signal at a microwave output circuit 14. As shown in FIGURE 1*a*, the high-frequency discharge device of the invention comprises seven basic elements; namely, a first slow-wave structure 16 of an inter-digital form positioned parallel to a sole member 18 and forming therewith a first inter-action space, an electron gun generally designated 20 adjacent one end of the first slow-wave structure for projecting an electron beam through said inter-action space, a second slow-wave structure 22 of split-folded waveguide form positioned adjacent an electron emissive sole electrode 24 and forming therewith a second inter-action space, an attenuator element 26 separating the first and second slow-wave structures, and a collector electrode 28 including a magnetic shunt element 30 associated therewith for terminating the electron beam and end of said second interaction space remote from the attenuator 26.

Referring now to the specific elements of the device of the invention, the slow-wave structure 16, which is preferably interdigital in form, may be coupled to input circuit 12 in any of the several manners known to the art, and is disposed parallel to the sole member 18 forming a first inter-action space therebetween. Adjacent to the input end of the sole 18 the electrode gun 20 is disposed comprising a grid electrode 32, partially circumjacent, a cathode 34 and an accelerator electrode 36, which cooperate to form and direct an electron beam 38 along a predetermined path into the first inter-action space.

Continuing with the description of FIGURE 1*a*, the second slow-wave structure 22 is affixed at one end to the other side of the attenuator opposite structure 16, in sequential relation therewith. The second slow-wave structure 22 in turn is disposed parallel and adjacent to the emitting sole 24 in sequential relationship with the non-emitting sole member 18, and forms a second inter-action space with the second slow-wave structure. The second slow-wave structure 22 is terminated at its other end by output circuit 14, which is affixed thereto and functions as a means for extracting amplified electromagnetic energy from the device and communicating it to an external load. The vacuum tube is terminated finally by the collector electrode 28 and its associated magnetic shunt element 30, which function to catch residuary electrons of the electron beam which have not been captured during their travel through the second inter-action space or have not returned to the emitting sole.

It should be noted here that, although not shown, any suitable means, such as a permanent magnet or electromagnet may be provided for supplying an associated cross-magnetic field needed for operation of the device. In FIGURE 1*a*, the magnetic field is indicated by the encircled X at B normal to the plane of the figure. The magnetic field provides, in combination with the transverse D.C. and R.F. electric fields, means for favorable phase focusing or bunching of electrons of the beam 38 which is necessary for transfer of energy from the beam to the slow-wave circuits.

Referring now to FIGURE 1*b*, there is shown a broadband forward-traveling wave amplifier 10 similar to that shown in FIGURE 1*a*, except that the slow-wave structure 16 is a modified form of a split folded waveguide having electrical characteristics substantially the same as those of structure 16 in FIGURE 1*a*. It should be noted that there are applications in which it is more desirable to employ this structure since it may be constructed having a configuration and dimensions compatible with the larger split folded waveguide structure 22 which will be described in more detail hereinbelow.

Figure 2A:
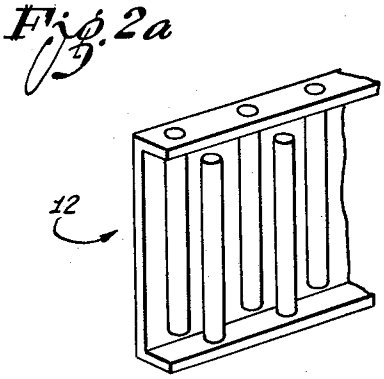
Figure 2B:
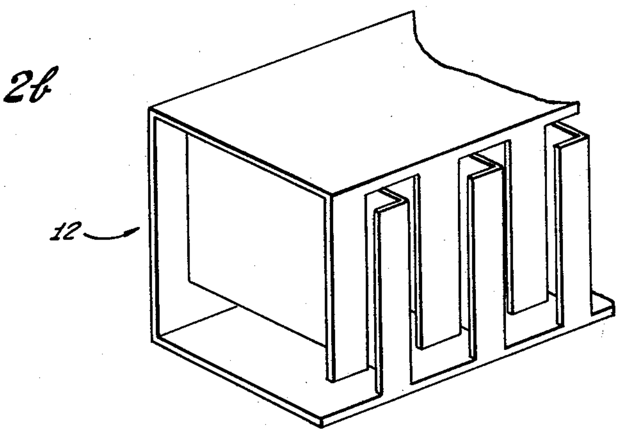
Figure 3:
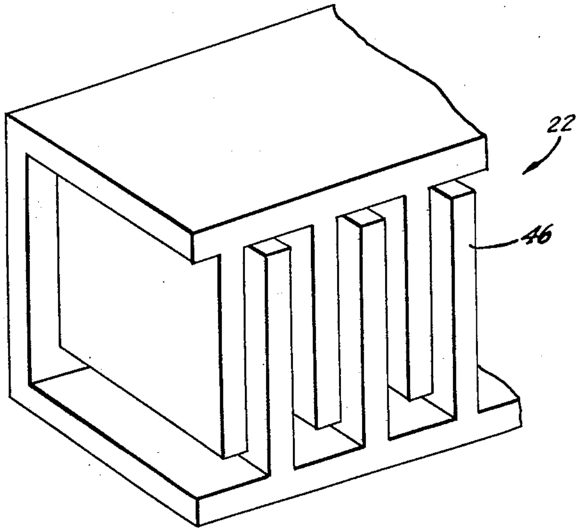
FIGURE 3 illustrates a fragmentary section of the split folded waveguide propagating circuit shown in FIGURES 1*a* and 1*b*.

Referring now to FIGURES 2*a*, 2*b*, and 3, there is shown fragmentary sectional views of the propagating circuits or slow-wave structure employed in the embodiments of the invention shown in FIGS. 1*a* and 1*b*. FIGURES 2*a* and 2*b* show slow-wave structures having the forms of an interdigital filter and a modified split folded waveguide, respectively, both of which are capable of providing on the order of 30 db gain over a twenty percent bandwidth. As discussed hereinabove, however, these structures are incapable of handling high level power at the ten kilowatts average level, for example.

In contrast, the second slow-wave structure of FIGURE 3 is of a split folded waveguide form and provides high heat transfer properties capable of dissipating high level power while concomittantly providing the same 20 percent frequency bandwidth as the structures shown in FIGURES 2*a* and 2*b*. It is to be understood, however, that the gain characteristics of this structure are less than those of the structures shown in FIGURES 2*a* and 2*b* as discussed hereinabove. It will be recognized that the ability of the folded waveguide structure to dissipate power resides in the fact that there is substantially more mass to the vanes and more metal in the top- back, and side walls of this structure than there is in either of the structures shown in FIGURES 2*a* and 2*b*.

Figure 4:
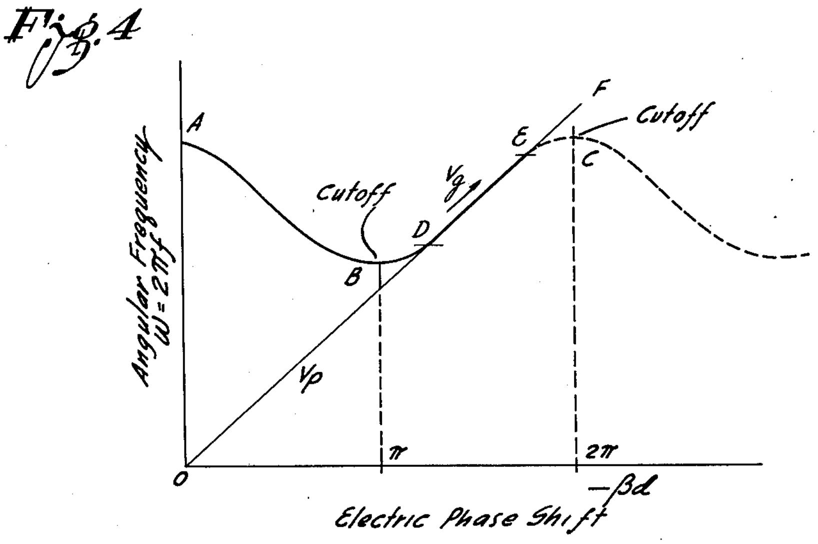
FIGURE 4 illustrates a typical plot of the forward wave non-dispersive characteristics of the propagating circuit structures shown in FIGURES 2*a*, 2*b*, and 3; and, FIGURE 5 is a cross-sectional view of another illustrative embodiment of the invention wherein a circular structure is employed.

Referring now to FIGURE 4, there is shown a typical characteristic curve illustrating the relationship between the operating frequency ($f$), expressed in terms of the angular frequency ($\omega$) and the electric phase shift between vane or finger elements, generally designated Beta ($\beta$) times the distance ($d$), which is the center to center spacing between adjacent vane or finger elements of the three slow-wave structures described hereinabove. In addition to the plot of $\omega$ versus $\beta d$ shown in FIGURE 4, there is shown a line OF, the slope of which represents the phase velocity ($v_p$) of a typical space harmonic of the slow-wave structure and its relationship to the group velocity of the structures.

The non-dispersive characteristic of the slow-wave structures can be seen by following the curve from the low frequency cutoff point B of the curve to the upper frequency cutoff point C of the curve. It can be seen from FIGURE 4 that the slope of line OF is substantially the same as that of the curve between points D and E.

Stated in another manner, in the case where $\beta d$ is directly proportional to $\omega$, and corresponds to a constant phase velocity independent of frequency, then the slow-wave structure is said to shown no dispersion characteristics. More particularly, it can be seen at once from FIGURE 4 that the group velocity ($v_g$), which is expressable as $\delta\omega/\delta\beta d$, is equal to $\omega/\beta d$ for the region between D and E of the plot, and consequently the phase velocity ($v_p$) is equal to the group velocity ($v_g$) over this range. Since the phase velocity of a wave traveling on the present slow-wave structures is equal to the group velocity thereof, it is possible to provide an electron beam in which the electrons of the beam are in synchronous relation with the phase velocity of a harmonic of the wave on the structures, with the result that the electrons will also be in synchronous coupling relationship with the group velocity of the space harmonic wave. The above discussion is true only for the region between points D and E shown in the plot of FIGURE 4.

Referring once again to FIGURE 1*a*, the emitting sole 24 is disposed parallel and adjacent to the second slow-wave structure 22, its length extending from the junction between the attenuator 26, and the second slow-wave structure 22 to a point adjacent the collector electrode 28 and the magnetic shunt element 30. The sole 24 has a large portion of its surface opposite the slow-wave structure coated with an adequate supply of electron emissive material providing an abundance of electrons for generating a cloud of electrons, designated 40. The quantity of electrons found in the interaction space between the sole 24 and the slow-wave structure 22 of course depends upon the mode of operation of the device at the time as will be described in greater detail hereinafter.

Continuing now with the description of FIGURE 1*a*, the collector 28 and its associated magnetic shunt element 30 are adjacent one another and disposed on the end of the second inter-action space, these elements providing means for collecting residuary electrons which may be defined as those electrons which do not impinge upon the slow-wave structure or return to the emitting sole as they pass through the inter-action spaces. The collector 30 has a surface 42 oblique to the surface of the emitting sole 24 in order that it may more readily intercept the residuary electrons. The magnetic shunt cooperates with the collector and functions to reduce the magnetic field strength in a localized area between the end of the slow-wave structure and collector causing the residuary electrons to be attracted to the collector at its surface 42. Another function of the collector, of course, is to collect the electron beam when no input signal is applied to the device.

Consider now the electrical operation of the broadband amplifier shown in FIGURE 1*a* when an input electromagnetic wave is applied to input circuit 12 and is thereafter propagated along the circuit 16 towards its opposite end where the attenuator 26 is located. The cathode 34 is energized by means of a suitable heater coil having a voltage impressed thereon to provide a source of electrons for the electron beam 38 which flows into the inter-action spaces between the propagating circuits 16 and 22, and their corresponding sole elements 18 and 24. As the electron beam travels through the inter-action spaces, it is subjected to the electric fields associated with the propagating circuits and the fields of a suitable heater coil having a voltage impressed thereon to provide a source of electrons for the electron beam 38 which flows into the inter-action spaces between the propagating circuits 16 and 22, and their corresponding sole elements 18 and 24. As the electron beam travels through the inter-action spaces, it is subjected to the electric fields associated with the propagating circuits and the fields of a suitable magnetic source. The electron optics of the device are determined by the relationship of the electric field set up by the accelerator 36 and the grid electrode 32 and the electric field set up by the slow-wave circuit 16 and the sole element 18 at the entrance of the first inter-action space near the input end of the device. The D.C. electric fields are substantially parallel to one another, and the field between the slow-wave circuit 16 and the sole 18 is substantially equal to twice that in the region near the accelerator and grid electrodes. Thus, the electron beam leaves the electric field of the accelerator and the grid at a predetermined velocity such that the increased electric field provided by the slow-wave circuit 16 and the sole 18 causes the beam to enter the inter-action space therebetween in a predetermined coupling relationship to the first slow-wave structure 16, and the input electromagnetic energy wave thereon. The resultant velocity of the electron beam is derived from the transverse and forward velocity components of the electrons which form the beam.

As the electrons of the electron beam travel through the first interaction space in coupling relationship with the electromagnetic wave on the slow-wave circuit, they are subjected to a phase focusing action which causes them to be grouped into discrete bunches in a manner well known in the prior art. As will be seen from FIGURES 1*a* and 1*b*, the electron beam is depicted as interacting with the mid-band space harmonic of the wave traveling on the slow-wave circuit. This is evidenced by the fact that the crest of the bunches being formed at mid-frequency appear at intervals spaced one and one-half times the spacing between adjacent fingers of the slow-wave circuit; at the low-frequency end of the band, the crest of the bunches would appear at every other element of the circuits, while at the high-frequency end of the band the crest of the bunches would appear at each one of the elements of the circuit.

As the electron beam travels along the first inter-action space adjacent slow-wave structure 16, they become bunched and move closer and closer toward the slow-wave structure; however, the electrons do not strike the slow-wave structure because its length is such that it terminates at the attenuator 26 at a distance short of the point where the bunched electrons would impinge upon the structure were it longer. Moreover, the electromagnetic wave which has been coupled to the slow-wave structure and travels down the structure is attenuated by the attenuator 26 upon its arrival thereat, while the electrons bunched as a result of the aforesaid inter-action continue to travel past the attenuator between the two slow-wave structures 16 and 22 enroute to the second inter-action space between the second slow-wave structure 22 and the emitting sole 24.

The bunched electrons produced in the first inter-action space between the structure 16 and the sole 18 pass the attenuator 26 after being slightly debunched and enter the second inter-action space between the structure 22 and sole 24 whereby very strong initial R-F fields are induced upon the structure 22 by these electron bunches. It will be recalled that the slow-wave structure 16 is a high-gain structure, and, as such, causes very tight bunching of the electrons in the beam as they traverse the first inter-action space. This accounts for the fact that the electrons are only slightly debunched when they pass from the first to the second inter-action space, and also accounts for the strong induced field on the second slow-wave structure.

The electrons which are emitted from the emitting sole 24 form the electron sheath or cloud 40 in the second inter-action space adjacent the sole 24. In the presence of the crossed magnetic and electric fields, and the induced R-F fields, these electrons behave in a manner similar to the electrons emitted from the cathode of a conventional magnetron of the prior art. Stated in another manner, there is a distorted sheath with spoke-like ridges extending toward the second slow-wave structure which moves along with the R-F fields as they propagate on the high power slow-wave structure 22.

Thus, the moving spoke-like sheath and the incoming bunched electron beam automatically become synchronized due to phase focusing action and propagate with a velocity that keeps them bunched in step with the R-F fields induced on the second slow-wave structure by the electron bunches arriving from the first inter-action space. The ends of these spokes may be thought of as brushing past the exposed vane-like elements 46 of second slow-wave structure 22 during the process of transferring energy from the electron beam and the emitting sole to the delay line, although as a practical matter a substantial portion of the electrons are collected on structure 22 near its output end after they have given up their energy to the circuit.

It should be noted at this point that the input power supplied to the emitting sole is a function of the amplitude of the signal being amplified so long as the tube is operating below saturation. Stated in another manner, when there is no signal fed into the device, the electron beam passes through the inter-action space between the first slow-wave structure 16 and the sole 18 unbunched. Since the electron beam is unbunched, it does not induce the usual useful R-F fields on the second slow-wave structure as it passes through the second inter-action space and, consequently, essentially no circuit current is drawn by the second slow-wave structure. However, when an electromagnetic signal is fed into the device, R-F fields are induced in the second slow-wave structure by the electrons which have been tightly bunched in the first inter-action space. As has been explained hereinabove, the induced R-F fields cause the bunched electrons to be drawn toward the slow-wave structure as they travel along the inter-action space and may be intercepted on the structure near its output end. Thus, this mode of operation is similar to class AB operation in an ordinary amplifier in that the plate current, here the second slow-wave cuurrent, is only drawn in large amounts when there is a corresponding input signal introduced on the first slow-wave structure.

As described previously, a portion of the electrons in the electron stream actually strike the second slow-wave structure, thereby generating heat which is dissipated relatively easily because the massive physical characteristics of this structure. However, this occurs only after the electrons have given up or transferred substantially all of their R-F energy to the forward traveling wave which moves to the end of the second slow-wave structure and is thereafter propagated through output circuit 14 to provide the microwave output signal. The residuary electrons which have not been collected on the circuit or returned to the emitting sole are in turn collected on collector electrode 28 after having contributed to the generation of the microwave output signal.

Consider now the advantages which are derived through the use of the novel combination of two different slow-wave structures and two sources of electrons in accordance with the teachings of the invention as described hereinabove. Firstly, owing to the inherent properties of the individual slow-wave structures, such as the high impedance of the first structure and the large mass of the second structure, the combination thereof will provide maximum coupling efficiency for high gain and maximum heat transfer capabilities for high-power operation. In addition, both of these structures have phase velocity versus frequency characteristics which are relatively constant for a given wide-frequency range. Thus, one is enabled to achieve the aforesaid coupling efficiency and heat transfer capabilities over a correspondingly wide frequency range.

A second advantage arises from the fact that there is provided two different sources of electrons which contribute to the formation of an electron beam having higher current intensity per unit length than that known heretofore in the traveling-wave amplifiers of the prior art. It will be recalled, in accordance with the teachings of the invention, that the electron bunches formed in the first inter-action space combine in a predetermined phase focusing relationship with the electrons of the electron cloud. Therefore, the two groups of electrons combine to form a higher density beam than would be provided by either of the groups individually as is customary in the prior crossed-field, traveling forward-wave amplifiers.

Finally, it shrould be noted that the device of the invention distinguishes over the prior art traveling wave tube devices in that the present device operates in a manner similar to class AB operation in an ordinary amplifier, in that the circuit current of the second slow-wave circuit is controlled by the amount of input signal introduced on the first slow-wave circuit. Thus, the efficiency of operation is greater since current is not drawn by the tube when there is no input signal applied. This advantage in efficiency is applicable to both pulse and continuous operation. Stated in another manner, during a pulse type operation, current is drawn only during the pulse interval. Moreover, in certain continuous wave applications where it is sometimes desirable to cut the device off momentarily to "look through" at the signal being jammed, the fact that no current is drawn by the tube when the input signal is removed may be utilized to great advantage.

Figure 5:
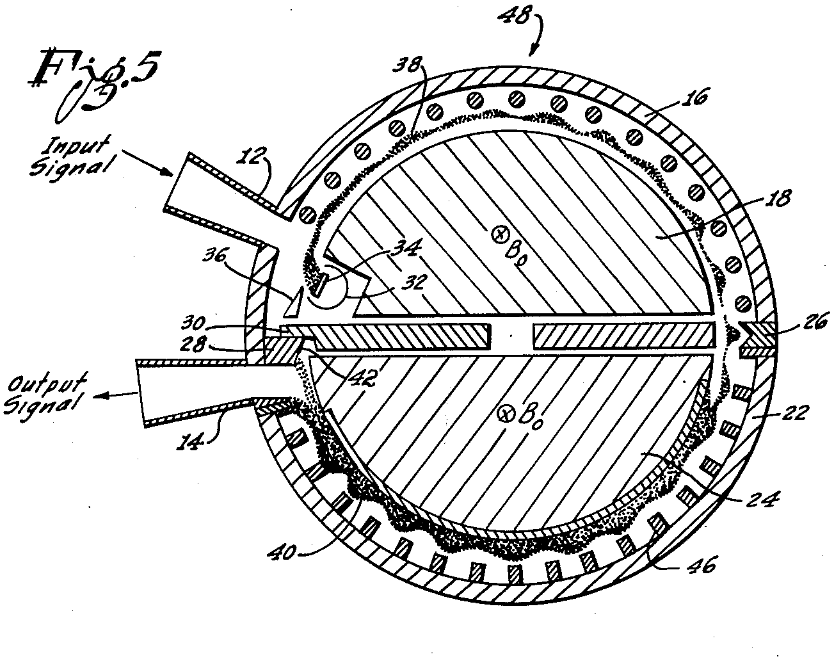

Referring now to FIGURE 5, there is shown a cross-sectional view of a forward-traveling wave amplifier 48 of circular configuration incorporating the basic concept of the invention wherein like or corresponding parts are designated by the same reference characters as are shown in FIGURE 1*a*. FIGURE 5 is considered substantially identical conceptually to the embodiment shown in FIGURE 1*a*, including the slow-wave structure 16 and the slow-wave structure 22, the principal distinction being that several of the structural elements and the path of the electron beam have curved configurations. However, the circular structure of FIGURE 5 provides a more compact device than the rectilinear structure of FIGURES 1*a* and 1*b* and therefore provides an added advantage to the device for use in applications where a more compact device is required.

In operation, the device of FIGURE 5 operates essentially the same as the device shown in FIGURES 1*a* and 1*b*, and the fact that the electron beam must follow a curved path does not hinder the device from operating similar to the rectilinear device. In both of the devices, the spacing between the slow-wave structures and the associated soles is relatively small in comparison with the radius of curvature of the interaction spaces, and hence the mean distance travelled by an electron along a section of the circumference of the circular embodiment of FIG. 5 is substantially equivalent to the distance traveled in the corresponding rectilinear device of FIGURES 1*a* and 1*b*.

In practice, it has been found that the utilization of the basic concepts herein set forth will provide broadband forward-traveling wave amplifiers which are capable of operating at relatively high power levels of the order of ten kilowatts average C.W. power or one megawatt pulse power, while simultaneously providing amplification on the order of 30 db over frequency ranges greatly exceeding what has heretofore been achieved by any known prior art forward-wave amplifier.

While the amplifiers of the invention have been described with reference to only three particular embodiments, it is to be understood, of course, that alterations and modifications may be made in the structure and circuits shown without departing from the spirit and scope of the invention. Accordingly, it is to be expressly understood that the foregoing description shall be interpreted only as illustrative of the invention and that the spirit and scope of the invention is to be limited only by the appended claims when accorded the broadest interpretation consistent with the basic concepts taught herein.

What is claimed as new is:

1. In a forward traveling-wave amplifier wherein the electrons in a relatively low current electron beam are phase focused by the interaction between the beam and an electromagnetic wave, corresponding to an applied input signal, propagating along a first high impedance slow wave structure, the combination comprising: a second low impedance slow wave structure sequentially positioned with respect to said first slow wave structure; attenuating means separating said slow wave structures for attenuating the forward traveling wave on said first structure while permitting the phase focused electron beam to continue into the region adjacent the second slow wave structure; an electron emissive sole spaced from and extending adjacent to said second slow wave structure and forming therewith a low impedance interaction space electron-optically aligned with the path of the phase focused electron beam whereby said phase focused beam induces a forward traveling wave on said second slow wave structure; and means for supplying crossed electric and magnetic fields within said interaction space to extract a relatively high current electron cloud from said electron emissive sole in coupled relationship with the forward traveling wave on said second slow wave structure for synchronizing portions of said electron cloud in phase with the phase focused beam whereby R-F energy in said electron cloud is surrendered to the electromagnetic wave on said second slow wave structure.

2. The combination defined in claim 1 wherein said second slow wave structure has a split folded waveguide form.

3. The combination defined in claim 1 which further includes collector means positioned adjacent the end of said second slow wave structure remote from said attenuator means for collecting electrons from said electron beam and cloud.

4. In a forward traveling-wave amplifier having crossed magnetic and electric fields wherein amplification is achieved by the inter-action of electro-magnetic wave energy propagated by successive slow-wave structures with a relatively low current electron beam traveling in the same direction as the electromagnetic waves the combination comprising: an electron gun for producing an electron beam of substantially uniform velocity which travels along a predetermined path; a broadband high-gain slow-wave structure of interdigital form having first and second ends; a non-emitting sole positioned parallel to and spaced from said first slow-wave structure and defining therewith a first interaction space encompassing a portion of said predetermined path; means for launching a microwave input signal as an electromagnetic wave on said high gain structure for phase focusing the electron beam; an attenuator element affixed on one side to the end of said high gain slow-wave structure remote from said electron gun for attenuating the electromagnetic wave on said high gain slow-wave structure; a high power slow-wave structure having a split folded waveguide form connected to the other side of said attenuator; an electron emitting sole disposed parallel to and spaced from said high power slow-wave structure and forming therewith a second interaction space encompassing another portion of said predetermined path, said electron emitting sole producing a relatively high current electron cloud portions of which are synchronized in phase with the phase focused beam supplied by said electron gun for generating on said high power slow-wave structure an output traveling wave; output means coupled to said second slow-wave structure for extracting magnetic wave energy therefrom; and means for collecting electrons after they have contributed their R.-F. energy to the output traveling wave.

5. A broadband amplifier tube for amplifying forward traveling electromagnetic wave energy, said amplifier tube comprising: high impedance means for propagating input electromagnetic wave energy along a predetermined path at a prescribed velocity; means for generating a relatively low current electron beam at substantially said prescribed velocity; crossed magnetic and electric field means for directing the path of said electron beam in the same direction as said electromagnetic energy wave and in coupling relationship with said means for propagating said electromagnetic wave energy to phase focus said electron beam; and output means responsive to said phase focused beam for producing a high power electromagnetic output wave, said output means including low impedance slow wave structure for supporting the output wave and an associated electron emitting sole forming with said slow wave structure a low impedance interaction space through which the phase focused beam is projected, the electrons emitted from said sole initially forming a relatively high current electron cloud portions of which are subsequently synchronized in phase with the phased focused electrons in the electron beam for contributing radio frequency energy to said output wave.

6. In a traveling forward-wave tube of the magnetron type for amplifying a microwave input signal represented by an input electromagnetic wave, the combination comprising: first high impedance circuit means including a first slow wave structure and an associated electrode parallel thereto and forming therebetween a first high impedance interaction space; second low impedance circuit means including a second slow wave structure and a parallel electron emissive electrode forming therewith a second low impedance interaction space, said first and second circuits being positioned relative to each other to maintain said interaction spaces in electron-optical alignment; electromagnetic wave attenuating means disposed between said first and second circuits for inhibiting the passage of electromagnetic waves therebetween; means for applying the microwave input signal to the slow wave structure of said first circuit; means for producing crossed electric and magnetic fields in said first and second interaction spaces; and means for projecting a relatively low current electron beam through said first and second interaction spaces, the electrons in said beam being velocity modulated by the microwave input signal while traversing said first interaction space, and thereafter inducing an electromagnetic output wave on the slow wave structure of said second circuit means, said electron emissive electrode in said second circuit means generating a relatively high current electron cloud which re-enforces the velocity modulated electrons in the electron stream to increase the energy in said electromagnetic output wave.

7. The combination defined in claim 6 wherein said slow-wave structure in said second circuit means has the form of a relatively massive split folded waveguide.

8. A broadband amplifier tube for amplifying forward traveling electromagnetic wave energy, said amplifier tube comprising: high impedance means for propagating input electromagnetic wave energy along a predetermined path at a prescribed velocity; means for generating a relatively low current electron beam at substantially said prescribed velocity; crossed magnetic and electric field means for directing the path of said electron beam in the same direction as said electromagnetic energy wave and in coupling relationship with said means for propagating said electromagnetic wave energy to phase focus said electron beam; low impedance output means responsive to said phase focused beam for producing a high power electromagnetic output wave, said output means including a slow wave structure for supporting the output wave and an associated electron emitting sole forming with said slow wave structure a low impedance interaction space through which the phase focused beam is projected to induce an electromagnetic output wave on said slow wave structure, the electrons emitted from said sole forming a relatively high current electron cloud portions of which are synchronized in phase with the phase focused electrons in the electron beam for contributing radio frequency energy to said output wave, and means coupled to said slow wave structure for extracting output energy therefrom.

9. In a traveling forward-wave tube of the magnetron type for amplifying a microwave input signal represented by an input electromagnetic wave, the combination comprising: first circuit means including relatively high gain slow wave structure and an associated electrode parallel thereto and forming therebetween a first high impedance interaction space; a second circuit means including a relatively high power slow wave structure and a parallel electron emissive electrode forming therewith a second low impedance interaction space, said first and second circuits being positioned relative to each other to maintain said interaction spaces in electron-optical alignment; electromagnetic wave attenuating means disposed between said first and second circuits for inhibiting the passage of electromagnetic waves therebetween; means for applying the microwave input signal to the slow wave structure of said first circuit; means for producing crossed electric and magnetic fields in said first and second interaction spaces; and means for projecting a low current electron beam through said first and second interaction spaces, the electrons in said beam being velocity modulated by the microwave input signal while traversing said first interaction space, and thereafter inducing an electromagnetic output wave on the slow wave structure of said second circuit means, said electron emissive electrode in said second circuit means being responsive to said crossed electric and magnetic fields and to said output wave for generating a high current electron cloud which re-enforces the velocity modulated electrons in the electron stream to increase the energy in said electromagnetic output wave.

10. In a forward traveling-wave amplifier having crossed magnetic and electric fields wherein amplification is achieved by the inter-action of electro-magnetic wave energy propagated by successive slow-wave structures with an electron beam traveling in the same direction as the electromagnetic waves the combination comprising: an electron gun for producing a low current electron beam of substantially uniform velocity which travels along a predetermined path; a circularly shaped broadband high-gain slow-wave structure of interdigital form having first and second ends; a non-emitting sole positioned parallel to and spaced from said first slow-wave structure and defining therewith a first high impedance interaction space encompassing a portion of said predetermined path; means for launching a microwave input signal as an electromagnetic wave on said high gain structure for phase focusing the electron beam; an attenuator element affixed on one side to the end of said high gain slow-wave structure remote from said electron gun for attenuating the electromagnetic wave on said high gain slow-wave structure; a circularly shaped broadband high power slow-wave structure having a split folded waveguide form connected to the other side of said attenuator, said high power slow wave structure and said high gain structure have substantally the same radius of curvature; an electron emitting sole disposed parallel to and spaced from said high power slow-wave structure and forming therewith a second low impedance interaction space encompassing another portion of said predetermined path, said electron emitting sole producing a high current electron cloud portions of which are synchronized in phase with the phase focused beam supplied by said electron gun for generating on said high power slow-wave structure an output traveling wave; output means coupled to said second slow-wave structure for extracting magnetic wave energy therefrom; and means for collecting electrons after they have contributed their R-F energy to said output wave.

11. A broadband forward wave amplifier of a magnetron type having crossed magnetic and electrostatic fields, said amplifier comprising: an evacuated enclosure having input and output end; an electron gun for producing an electron beam, said gun being disposed within said enclosure near the input end for producing and directing a low current electron stream along a predetermined path; a non-emissive sole electrode disposed adjacent said cathode; a first high impedance slow-wave structure disposed within the enclosure near said input end adjacent and parallel to said non-emissive sole electrode and forming therewith a first high impedance interaction space, said first slow-wave structure being operative to propagate an electromagnetic input wave received through the input end of said enclosure; means for establishing magnetic and electrostatic fields within said first interaction space, said electron stream traveling through said first interaction space in coupling space relationship with the electromagnetic wave propagating on said slow-wave circuit and forming electron bunches therealong; an attenuator element affixed on one side to said first slow-wave stucture circuit for attenuating said electromagnetic input wave; a second low impedance slow-wave circuit disposed adjacent the other side of said attenuator for propagating and amplifying a traveling electromagnetic wave induced thereon; an emissive sole electrode disposed adjacent and parallel to said second slow-wave circuit and in alignment with said non-emissive sole electrode forming a second low impedance interaction space therebetween having an input and output portion, said first and second interaction spaces forming a continuous interaction space along the path of the electron beam, said emissive sole electrode providing a high current cloud of electrons within said second interaction space, the bunched electrons which travel through the first interaction space entering the second interaction space in coupling relationship with the second slow-wave circuit for inducing a synchronous harmonic electromagnetic wave therein and establishing a synchronous phase relationship between a large number of the electrons and said electron cloud and said bunched electrons to provide means for amplifying the induced wave; a collector electrode including an associated magnetic shunt disposed adjacent said output end of said enclosure for collecting residuary electrons which have not impinged on the slow wave structure during their travel through the second interaction space.

12. The combination defined in claim 11 wherein both said non-emissive and said emissive sole electrodes have a substantially semi-circular configuration and said first and second slow-wave structure are curved concentrically with respect to their corresponding sole electrodes.

13. The method of amplifying a microwave input signal which comprises the steps of: launching the input signal as an electromagnetic input wave along a first slow wave structure; generating a relatively low current electron beam in coupled relationship with the electromagnetic input wave for phase focusing the electrons therein; attenuating the electromagnetic input wave; inducing an electromagnetic output wave on a second slow wave structure with the phase focused electron beam; and generating a relatively high current electron cloud, a portion of which is synchronized in phase with the phase focused beam for increasing the energy in the electromagnetic output wave.

14. The method of extracting microwave output energy from a relatively low current electron beam which has been phase focused by a microwave input signal, said method comprising the steps of: projecting the low current phase focused beam adjacent a slow wave structure for inducing thereon an electromagnetic output wave; generating a relatively high current electron cloud adjacent the slow wave structure for reinforcing the phase focused beam through the phase focusing action of the electromagnetic output wave; and extracting a microwave output signal from the electromagnetic output wave.

15. The method of amplifying a microwave input signal which comprises the steps of: launching the input signal as an electromagnetic input wave along a first slow wave structure; generating a relatively low current electron beam in coupled relationship with the electromagnetic input wave for phase focusing the electrons therein; attenuating the electromagnetic input wave; inducing an electromagnetic output wave on a second slow wave structure with the phase focused electron beam; generating a relatively high current electron cloud substantially along the length of and adjacent the second slow wave structure for reinforcing the phase focused beam through the phase focusing action of the electromagnetic output wave; and converting the electromagnetic output wave to a microwave output signal.

16. The method of operating an amplifier tube having an electron gun for producing a low current electron beam, a first high impedance slow wave structure having first and second ends, a nonemitting sole in spaced relationship with said first slow wave structure and defining a first high impedance electron and electromagnetic wave interaction space therebetween, an attenuator affixed to one end of said first slow wave structure remote from said electron gun, a second low impedance slow wave structure connected to the other side of said attenuator, an electron emitting sole disposed in spaced relationship with said second slow wave structure and forming therewith a second low impedance interaction space, and means for launching a microwave input signal as an electromagnetic wave on said first slow wave structure, said method comprising the steps of launching an input signal as an electromagnetic input wave along said first slow wave structure, generating and launching a low current electron beam in coupled relationship with the electromagnetic input wave for phase focusing the electron beam, attenuating the electromagnetic input wave with said attenuator, inducing an electromagnetic output wave on said second slow wave structure with the phase focused electron beam, and generating a high current electron cloud portions of which are in synchronous phase relationship with the phase focused beam for increasing the energy in the electromagnetic output wave coupled from said tube.

17. The method of operating an amplifier tube having an electron gun for producing an electron beam, a first high impedance slow wave structure having first and second ends, a nonemitting sole in spaced relationship with said first slow wave structure and defining a first high impedance electron and electromagnetic wave interaction space therebetween, an attenuator element affixed to one end of said first slow wave structure remote from said electron gun, a second low impedance slow wave structure connected to the other side of said attenuator, an electron emitting sole electrode disposed in spaced relationship with said second slow wave structure and forming therewith a second low impedance interaction space in series relationship with said first interaction space, means for launching a microwave input signal as an electromagnetic wave on said first slow wave structure, and means for coupling microwave energy from said tube to an external load, said method comprising the steps of projecting a low current electron beam into said first interaction space adjacent said first slow wave structure whereby the electrons of said electron beam are velocity modulated by said input signal, generating a high current electron cloud adjacent said second structure for reinforcing the velocity modulated beam through the phase focusing action of the electromagnetic output wave induced on said structure by said modulated electron beam, and extracting the amplified microwave output signal generated in said tube.

18. A travelling wave type tube comprising means for forming an electron beam, a first slow wave transmission circuit of high impedance and of relatively light construction in coupling proximity with said beam, and a second slow wave transmission circuit of significantly lower impedance and of heavier construction with correspondingly better heat dissipation characteristics than said first slow wave transmission circuit in coupling proximity with said beam downstream from said first slow wave transmission circuit.

19. A travelling wave type tube comprising means for forming an electron beam, a first slow wave transmission circuit of high impedance and of relatively light construction in coupling proximity with said beam, and a second slow wave transmission circuit of significantly lower impedance and of heavier construction with correspondingly better heat dissipation characteristics than said first slow wave transmission circuit in coupling proximity with said beam downstream from said first slow wave transmission circuit, both of said slow wave transmission structures having phase velocities approximating the velocity of the electrons in the beam with which they are coupled, and means for augmenting the density of said electron beam in the vicinity of said second slow wave transmission circuit.

20. A travelling wave type tube comprising means for forming an electron beam, a first slow wave transmission circuit of high impedance and of relatively light construction in coupling proximity with said beam, and a second slow wave transmission circuit of significantly lower impedance and of heavier construction with correspondingly better heat dissipation characteristics than said first slow wave transmission circuit in coupling proximity with said beam downstream from said first slow wave transmission circuit, both of said slow wave transmission structures having phase velocities approximating the velocity of the electrons in the beam with which they are coupled.

21. A travelling wave type tube comprising means for forming an electron beam, a first relatively high gain slow wave transmission circuit, a second relatively lower gain high power slow wave transmission circuit downstream from said first circuit, said second circuit including a plurality of repetitive structural units, and electrode means for continuously supplying electrons to said beam over a distance corresponding to a plurality of said structural units.

References Cited in the file of this patent

UNITED STATES PATENTS

| | | |
|---|---|---|
| 2,578,434 | Lindenblad | Dec. 11, 1951 |
| 2,622,158 | Ludi | Dec. 16, 1952 |
| 2,623,193 | Bruck | Dec. 23, 1952 |
| 2,636,948 | Pierce | Apr. 28, 1953 |
| 2,687,777 | Warnecke et al. | Aug. 31, 1954 |
| 2,776,389 | Peter | Jan. 1, 1957 |
| 2,794,939 | Huber | June 4, 1957 |
| 2,914,700 | Paananen | Nov. 24, 1959 |